(12) United States Patent  
Daly et al.

(10) Patent No.: US 8,812,607 B2  
(45) Date of Patent: Aug. 19, 2014

(54) PRIVATE MOBILE MESSAGING AND DATA COMMUNICATIONS APPARATUS AND METHOD OF MANAGING ORGANIZATIONAL MESSAGING

(75) Inventors: Kevin C. Daly, Anaheim, CA (US); Nicholas J. Dauderman, Newport Beach, CA (US); Joel Slutsky, Anaheim, CA (US); Tadeusz Peter Matuchniak, Irvine, CA (US)

(73) Assignee: Maxxess Systems, Inc., Yorba Linda, CA (US)

( * ) Notice: Subject to any disclaimer, the term of this patent is extended or adjusted under 35 U.S.C. 154(b) by 381 days.

(21) Appl. No.: 13/215,190

(22) Filed: Aug. 22, 2011

(65) Prior Publication Data

US 2012/0047214 A1 Feb. 23, 2012

Related U.S. Application Data

(60) Provisional application No. 61/376,171, filed on Aug. 23, 2010.

(51) Int. Cl.
| | | |
|---|---|---|
| H04W 4/02 | (2009.01) | |
| G06F 9/54 | (2006.01) | |
| H04L 29/08 | (2006.01) | |
| H04W 4/22 | (2009.01) | |

(52) U.S. Cl.
CPC ............ *G06F 9/546* (2013.01); *H04W 4/02* (2013.01); *H04L 67/26* (2013.01); *H04L 67/18* (2013.01); *H04W 4/22* (2013.01)

USPC ......... 709/207; 709/224; 455/404.1; 340/506

(58) Field of Classification Search
CPC .......... H04W 4/22; H04W 4/02; H04L 67/18; H04L 67/26
USPC .................... 709/204–207, 223, 224
See application file for complete search history.

(56) References Cited

U.S. PATENT DOCUMENTS

| | | | |
|---|---|---|---|
| 6,909,903 B2 * | 6/2005 | Wang .......................... | 455/456.1 |
| 7,177,623 B2 * | 2/2007 | Baldwin ..................... | 455/404.2 |
| 7,277,018 B2 * | 10/2007 | Reyes et al. ................ | 340/573.1 |
| 8,233,919 B2 * | 7/2012 | Haag et al. ................. | 455/456.3 |
| 8,270,937 B2 * | 9/2012 | Evans et al. ................ | 455/404.2 |
| 8,401,514 B2 * | 3/2013 | Ebdon et al. ............... | 455/404.1 |
| 2006/0025106 A1 * | 2/2006 | Byers et al. ................ | 455/404.2 |
| 2006/0178128 A1 * | 8/2006 | Eaton et al. ................ | 455/404.1 |
| 2007/0067202 A1 | 3/2007 | Siroko et al. | |
| 2008/0088428 A1 * | 4/2008 | Pitre et al. ................... | 340/506 |
| 2009/0138820 A1 | 5/2009 | Lockhart et al. | |
| 2009/0193130 A1 | 7/2009 | Fiatal | |
| 2010/0106786 A1 | 4/2010 | Horstmann et al. | |
| 2010/0151814 A1 * | 6/2010 | Bragg ......................... | 455/404.2 |

\* cited by examiner

*Primary Examiner* — David Lazaro
(74) *Attorney, Agent, or Firm* — Lazaris IP

(57) ABSTRACT

A private mobile data communications apparatus and methods of managing organizational data flow and coordinate a secure messaging infrastructure allow organizations to communicate with and monitor one or more mobile users each having at least one mobile device with which they communicate. The apparatus includes a server component, system client, a mobile client, and multiple application programming interface modules configured to manage information flow and correspond with external systems as needed.

24 Claims, 6 Drawing Sheets

PRIVATE MOBILE MESSAGING AND DATA COMMUNICATIONS APPARATUS AND METHOD OF MANAGING ORGANIZATIONAL MESSAGING

CROSS REFERENCE TO RELATED PATENT APPLICATIONS

This patent application claims priority U.S. provisional application 61/376,171, filed on Aug. 23, 2010, the contents of which are incorporated in their entirety herein.

FIELD OF THE INVENTION

The present invention relates generally to communications. More specifically, particular embodiments of the invention relate to an organizational critical messaging system, and related methods, for enabling and implementing a messaging system that allows an organization to communicate critical information with mobile users in real time.

BACKGROUND OF THE INVENTION

Today's organizations are faced with challenges involving the need to make informed decisions in the shortest time possible. In order to make such informed decisions, organizations must get feedback or input from multiple members of their organizations, many of whom are available and reachable through mobile connections on mobile devices.

With today's increasingly mobile world—90% of the planet has access to mobile networks—organizations are able to connect to increasingly distributed groups. However, ubiquitous mobile connectivity has not yet provided these organizations with capabilities to connect to their mobile users utilizing structured and prioritized messaging. Organizations are faced with challenges in establishing priority connections to members to deliver and receive important information quickly, elevating priority for response and for requests and, furthermore, structuring these communications so the organization can make rapid and informed decisions.

Communications over mobile data networks for both business and non-business purposes have expanded rapidly, as exhibited by the explosion in text messaging, social networking, voice-over Internet protocol usage, and expanded messaging capabilities on mobile devices such as telephones. Advances in data connectivity such as LTE 3G and 4G data connectivity, GPS functionality, and push technology platforms, have enabled organizations to distribute and gather information directly and immediately. However, these same advances enable many other services to directly communicate with the same mobile devices and these communications aggregate on the same mobile devices with the organization's communications. Numerous applications exist that create a flood of information messages and updates but have little or no degree of priority and importance relative to the organization's communications. As a result, organizational priority access and information exchanged with mobile users is compromised and minimized by non-organizational information. Organizations therefore continually face significant challenges in communicating and receiving important information with their mobile users. Yet, mobility service and technology solutions have yet to be made available which are designed as a mobility solution, that are built for organizations, that enable those organizations to send and received communications on a dedicated system, that provide the organization with status and analytics of the communications, that aggregate the messages on a mobile application dedicated to the organization on their users mobile devices, that utilize emerging technological features to make those communications highly visible, and that structure messages between the organization and their mobile users.

In close correlation to the adoption of mobile devices is the world of online, web-based social networking. Individuals' willingness to connect in defined user groups for specific social and business reasons represents an unprecedented advancement in connectivity and socialization. As social networking opportunities increase and technology advances, individuals and organizations will become more and more connected and will continue to participate in this type of communication with growing frequency.

Since the invention of the pager, there have been many attempts to leverage mobile connectivity to extend messaging to a wider organized community of mobile users. These early concepts were handicapped by small populations of users, limited connectivity and crude mobile devices. Advancements in mobile device technology and networking present a game-changing opportunity to establish a prioritized solution for distributing important messages.

BRIEF SUMMARY OF THE INVENTION

The growth in use of mobile devices, mobile applications and social and professional online networking has opened opportunities for structured and priority handling of messages specifically tailored for communities of mobile device users. The present invention, known generally by its commercial brand as Ambit, is a tool that enables organizations to extend structured messaging to communities of people using mobile devices.

The present invention establishes a connection between the organization and its members in order to distribute important messages that are delivered using mobile device utilities and features to display and alert the mobile user that a priority message has delivered to the mobile user's device. The connection between the organization and mobile user is secure and authenticated, and all communications are made between end points that are dedicated to that communication between the organization and mobile user. All messages sent and received by the organization are logged and auditable by the organization, and messages received and sent by the mobile user are also logged and auditable on the user's mobile device.

The present invention is a method and apparatus to exchange secured, critical structured messages between an organization and mobile users. Features of the system enable prioritizing important information, empowering and demanding mobile user response, establishing real-time status, enhancing effectiveness and timeliness of event response, and enabling priority communications more effectively, directly, and around the clock to all selected personnel regardless of their location. The system contains structured messaging applications for organizations and their mobile users, which are delivered to organizations as a service. The service is designed to be deployed by organizations such as businesses, schools, clubs, unions, fan bases, law enforcement and government, and is extensible to smaller groups such as families, communities and neighborhoods. One objective of the invention is therefore to enable organizations to communicate directly with their mobile users on a system that provides applications for communication for both the organization and their mobile users.

The present invention is designed for organizations and to work over Internet-connected and mobile carrier networks. By establishing priority connectivity through Internet, push technology services and wireless carrier networks to mobile users of the organization, the invention improves organizational decision making, workforce security and safety, and raises the standard of mobile connectivity and information distribution. The invention is designed to deliver low-bandwidth structured messaging over a dedicated and prioritized network while minimizing use of mobile device resources such as battery power, computing, memory, and bandwidth.

Elements of the present invention's technology platform combine mobile data connectivity and structured messaging to provide a powerful mobile user connectivity tool. Among the many functions of the present invention are information distribution, such as prioritized handling of important information, from the organization, mobile user-initiated messaging to the organization, and status request messaging distribution from the organization. In each case, the use of data communication and push technologies over Internet and mobile data networks to send structured messages creates a highly organized and near real-time exchange of information.

The present invention's platform complements existing organizational communications such as e-mail, voicemail, instant messaging and voice. The Ambit service augments many operational activates of organizations such as security, mass notification communications, sales information and status, and business continuity operations which are focused on distributing and gathering time sensitive information and connecting to its mobile users. The system provides value as a highly adaptable and customizable system that can be implemented and used with minimal administrative burden on the organization.

Other benefits to the Ambit service include easy registration and management of users, linkage to other response organizations such as local law enforcement agencies, and extension of service to the families of personnel. The Ambit service also allows organizations to have their own colors, look and logo (i.e., a branded presence). The system provides organizations with a communication base to build on, and offers organizations a new, prioritized information sharing capability.

The Ambit service therefore offers product choices to organizations driven by at least two dynamics. The first of these is the rapidly-improving capabilities of mobile devices and the second is the maturation of user base expectations as they gain experience with this developing technology.

Accordingly, in one embodiment of the present invention, a private mobile data communications apparatus comprises a system client configured to manage interaction with a system user and including at least one system client database and a system client user interface controlled by an application server, a mobile client configured to manage interaction with a mobile user having one or more mobile devices assigned to the mobile user, and a secure messaging server configured to manage interaction between the system client and the mobile client and with one or more external systems providing supportive services to either of the system client or the mobile client, the secure messaging server including an application server component and a database server component each performing messaging functions in the interaction between the system client and the mobile client and with one or more external system. The apparatus also comprises an event relay module configured to initiate events from the secure messaging server and manage communication of event data between the secure messaging server and the system client, the mobile client, and the one or more external systems, the event data including information determined from initiated events among the messaging functions that is distributed to and collected from any of the system client, the mobile client, and the one or more external system, the messaging functions including executing instructions to send structured messages from the system client and receiving structured responses from the mobile client related to one or more initiated events, a first application programming interface module configured to respond to calls initiated for exchange of the event data between the secure messaging server and the system client to enable communication with the mobile user, and a second application programming interface module configured to respond to calls initiated for exchange of the event data between the secure messaging server to and the mobile client to enable communication with the system user.

In another embodiment of the present invention, a method of managing private communications with one or more mobile users within an organization comprises connecting an organizational system user with one or more mobile users in the organization via a secure messaging server configured to manage a system client for communicating with the organizational system user and a mobile client for communicating with the one or more mobile users, creating a structured request for information communicative of an event in response to an event initiation call from the secure messaging server to the one or more mobile users and pushing the information communicative of the event to at least one of the one or more mobile users, and enabling the at least one of the one or more mobile users to push, via a mobile device, a structured response having information responsive to the event to the secure messaging server that allows the organizational system user to interpret and execute a course of action related to the event initiation call.

In still another embodiment of the present invention, a method of coordinating a private mobile messaging infrastructure, comprising integrating a set of defined interface protocols that execute one or more messaging functions and facilitate communications between a system user and mobile users, the set of defined interface protocols including a relay protocol configured to call one or more external systems and execute events instructive of the one or more messaging functions, a system protocol configured to carry out messaging functions directed to the mobile users that include sending structured messages to and interpreting structured responses from the mobile users, and a mobile protocol configured to carry out messaging functions directed to the system user that including sending structured messages to and responding to structured messages from the system user via a mobile device.

Other embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the accompanying figures which form a part thereof, and in which is shown, by way of illustration, exemplary embodiments illustrating the principles of the present invention and how it is practiced. Other embodiments will be utilized to practice the present invention and structural and functional changes will be made thereto without departing from the scope of the present invention.

The present invention, referenced herein as the Ambit service and more generally as Ambit, is a communications platform and service that enables organizations to establish a priority channel to distribute critical messaging between, to and from communities of mobile users both within organizations and with users and systems external to organizations. The present invention can also be considered as a method and apparatus of providing information, empowering response, establishing real-time status, enhancing effectiveness of event response, and enabling support to all selected mobile users regardless of the time and their location. The present invention leverages the proliferation of mobile computing devices to interact with selected personnel via one or more software applications that are either resident on and/or accessible via the mobile computing devices. One aspect of the invention is that a message sent to any community of mobile users has an elevated requirement for a response from each and every mobile user. Furthermore, the system delivers messages that mobile applications display for response—the mobile user response in turn is in a structured format that can be quickly aggregated, and easily analyzed among many other mobile user responses, in just moments after the response is received by the organization. Finally the invention is designed to be agnostic of mobile device platforms as well as the underlying carrier used for general mobile voice/data functions.

Figure 1:
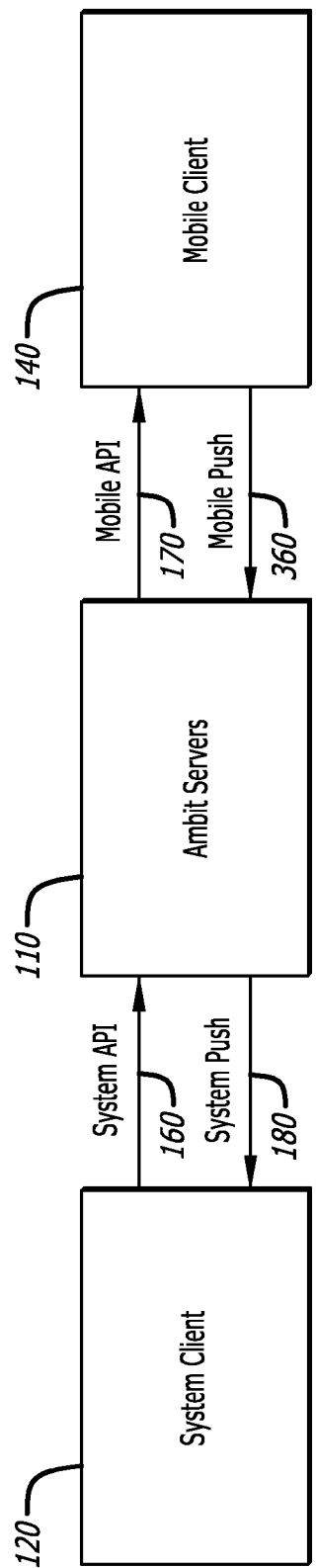
FIG. 1 is a block diagram of a private mobile data communications apparatus according to the present invention.
Figure 2:
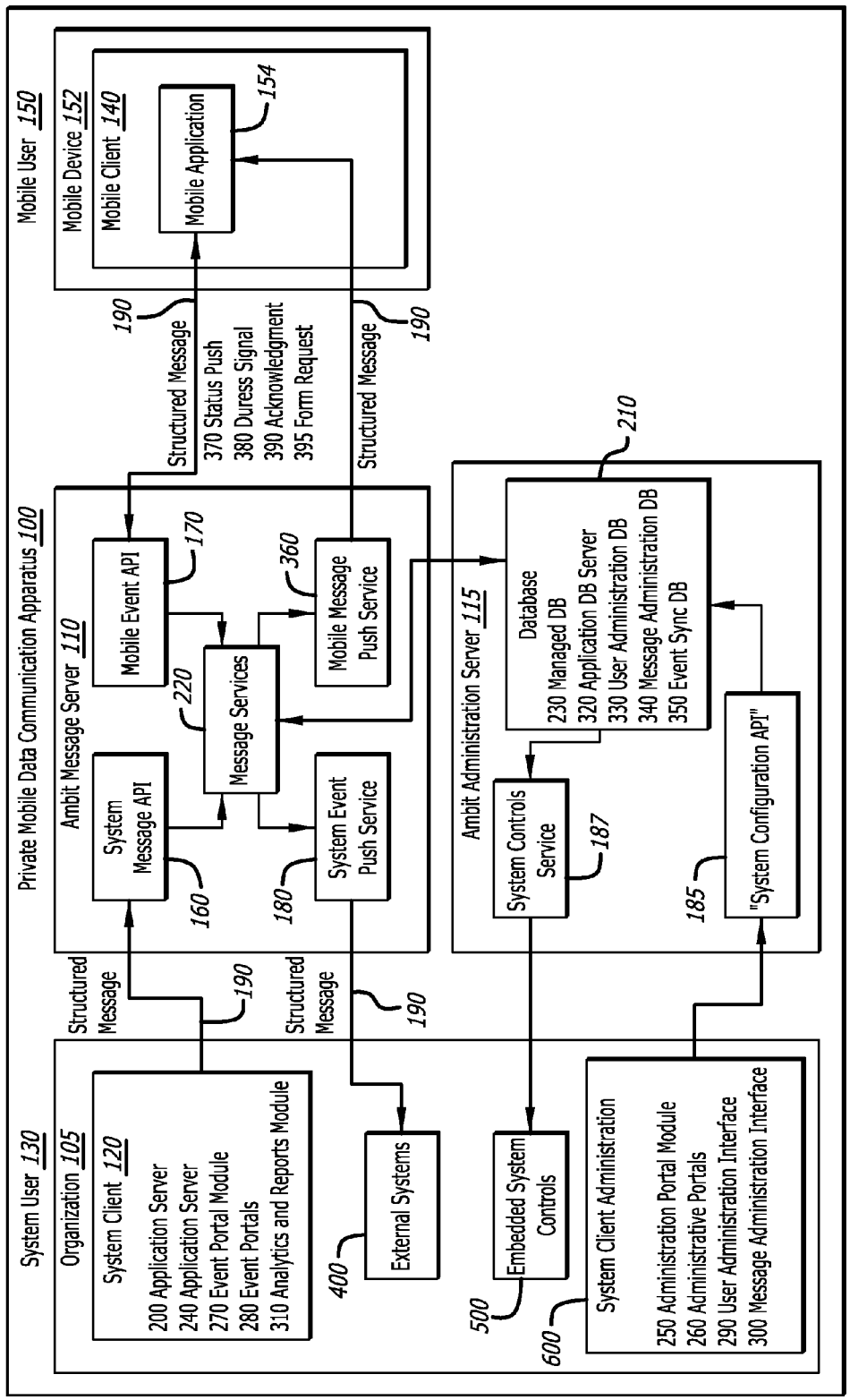
FIG. 2 is a block diagram of system components of a private mobile data communications apparatus according to the present invention.

FIG. 1 and FIG. 2 are block diagrams of a private mobile data communications apparatus 100 according to the present invention. The private mobile data communications apparatus 100 includes a server 110 having an application server 200 and a database server 210 as components thereof, known herein as the Ambit server 110. A system client 120 also having an application server 240 and a database server 320 as components thereof and hosting one or more portals is capable of communicating with one or more system users 130. A mobile client 140 is capable of communicating with one or more mobile users 150, each having at least one mobile device 152 running one or more mobile applications 154. A first application programming interface 160, also referred to herein as the Ambit system API 160 or simply the system API 160, is the programming infrastructure for communications involving the system client 120. A second application programming interface 170, also referred to herein as the Ambit mobile API 170 or simply the mobile API 170, is the programming infrastructure for communications involving the mobile client 140. A system event push service 180 manages the first and second application programming interfaces 160 and 170, and interactions between the various system components in the private mobile data communications apparatus 100 and with one or more external systems 400. A mobile push messaging service 360 manages push messaging, described in further detail herein, communicated to the mobile client 140 and then to the one or more mobile users 150 from the server 110.

The Ambit server 110 is the focal point and central element of the private mobile data communications apparatus 100 according to the present invention and enables exchanges of structured messages 190 between a system user 130 and mobile users 150. The server 110 includes server components such as an application server 200 and a database server 210. The application server 200 includes a messaging service module 220. The database server 210 includes a managed database 230, through which the server 110 is responsible for routing message traffic between the system user 130 and the mobile users 150. All message traffic in the Ambit service passes through the server 110, which communicates over local and wide area networks, the Internet, wireless (wifi) networks, and mobile and wireless carrier data, SMS, and voice networks, and uses mobile push service technology on different platforms.

FIG. 2 displays the private mobile data communications apparatus 100 of the present invention in more detail. The system user 130 is affiliated with an organization 105 that includes the system client 120 and interacts with the one or more external systems 400. Embedded system controls 500 and the system client administration portion 600, which may include various administrative portals and interfaces as described further herein, interact with an Ambit administration server 115 that manages various administrative functions in the Ambit service and with the system client 120. The Ambit administration server 115 manages a system configuration API 185 and a system controls service 187 that interact with the system client administration module 600, and embedded system controls 500, respectively.

Figure 3:
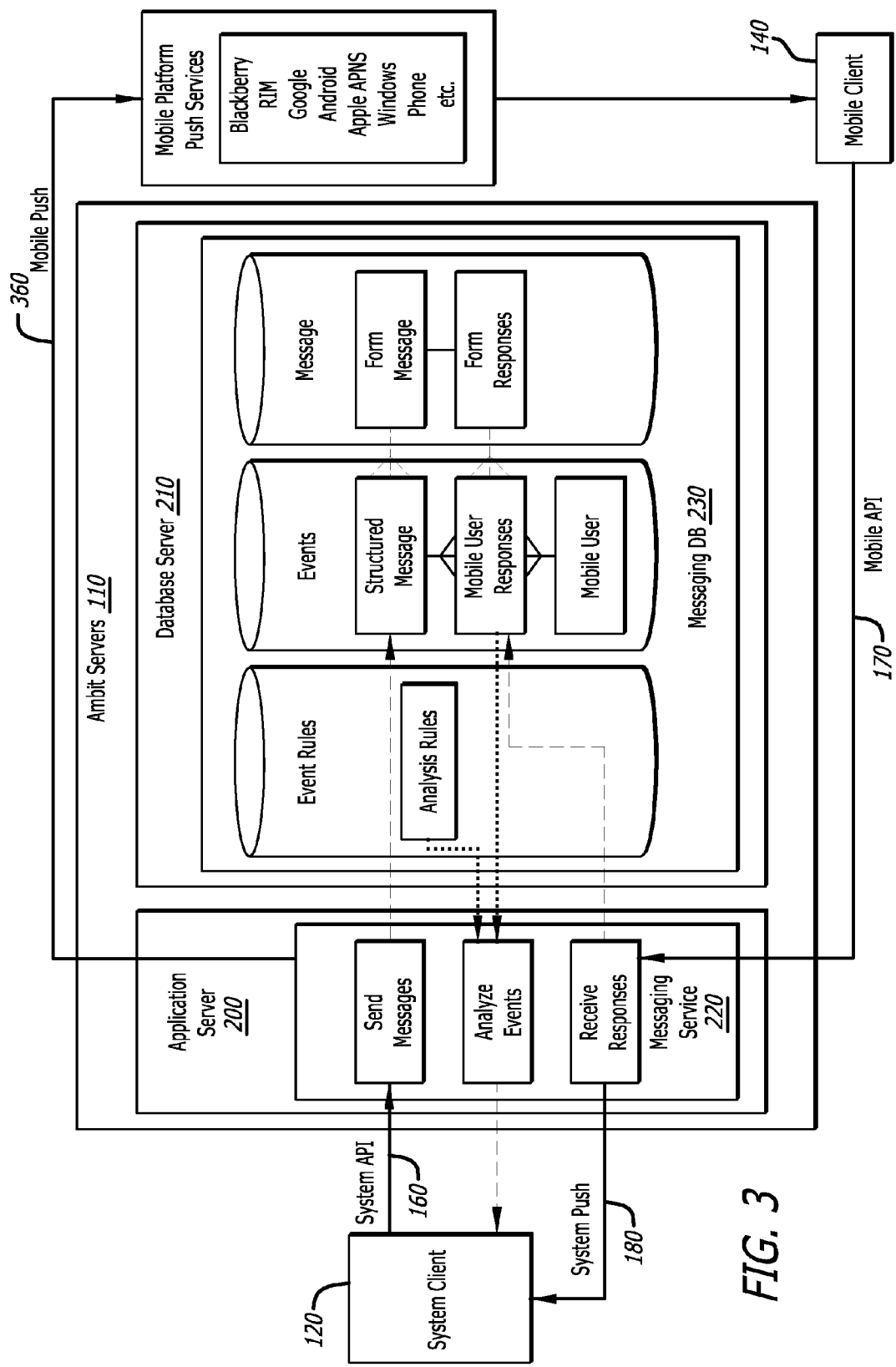
FIG. 3 is a block diagram of events associated with a private mobile data communications apparatus according to the present invention.

FIG. 3 is a block diagram depicting the server 110 in more detail, as the focal point and central element of communications between an organization 105 and its mobile users. The server 110 distributes and archives all message traffic for the Ambit service and provides the system client 120 with the ability to generate reports on this archive via response aggregation and message traffic analytics.

The server 110 is configured to perform message exchange, archiving and analytics services for the private mobile data communications apparatus 100. The application server 200 includes the messaging service module 220, which manages structured messaging 190 within the Ambit service, performing messaging sending functions that include communicating structured messages 190 from the system client 120 to the mobile client 140, and messaging receiving functions that include communicating structured messages 190 from the mobile client 140, as well as performing event analysis in coordination with the database server 210. The messaging service module 220 communicates with the database server 210 in the managed database 230 for storing information about the messaging functions, such as events, event rules, and messaging forms. The messaging service module 220 is therefore a focal point between the system event push service 180 and the mobile push messaging service 360.

Messaging systems are typically designed to convey an information payload from one user to another, such as, in general, from a sender to a receiver. For many uses the meta-information, often called metadata, [i.e. the information about the message] is of relatively little interest or use.

In the case of critical messaging applications, however, this metadata can be as important, or even more important, than the information in the message payload itself. The Ambit system has been defined with a very rich set of metadata and a protocol for that metadata called the Ambit Intelligent Message Structure, or AIMS, which enhances the ability to manage and analyze message traffic to accomplish functions such as assessing the status of a mobile workforce, validating the successful distribution of critical messages to a distributed population, maintaining the message thread for support requests from mobile workers and performing after-action or forensic analyses of event response activities.

The AIMS protocol is defined in Applications Programming Interface (API) specifications for both the mobile application component used by the mobile client 140 of the Ambit service and its system clients 120.

Typical examples of message metadata are globally-unique IDs of the message and the mobile devices, message type, times associated with message handling by various components of the mobile network infrastructure, status of the mobile device as reported to the mobile service carrier, geo-location of the mobile device (if permitted by the system protocol]), the ID of related or associated message(s), group associations of the mobile user, and application-unique metadata that can be utilized to achieve specific Ambit system capabilities required by individual users.

The AIMS protocol is designed to enhance the ability to manage all Ambit messages as a set of database objects that can be stored, queried and managed efficiently for analysis and reporting.

The server 110 architecture is adaptable and distributable, as is the Ambit service itself, to enable hosting of the private mobile data communications apparatus 100 in many different ways, including in a cloud computing environment, by an Internet service provider (ISP), or by an organization 105 itself. The choice of hosting option is influenced by the size and messaging needs of the organization. For example, smaller organizations 105 will likely choose a more hardware-intense hosting solution while larger ones could opt for any approach that suits their needs. Regardless, the present invention contemplates that functional and operational capabilities of the server 110 are not driven by the customer's choice of host, so that the system is scalable and practical to organizations 105 of all sizes.

The server 110 is designed to be highly stable and implementable as both dedicated to single systems and shared among different systems. The present invention contemplates that updates of the server's 110 software are synchronized so as to be independent of server 110 configuration for effective support. The capabilities of the server 110 are enhanced continuously to provide additional value-added services to mobile users 150, often as requested when customizing the system. Therefore it is to be understood that the server 110, and the Ambit service itself, regardless of network configuration, is highly customizable and configurable based on customer needs.

The highly customizable and configurable nature of the present invention means that the Ambit service may be utilized in many different organizational applications. Ambit's core messaging capabilities can be therefore used in many different organizational scenarios to communicate critical information to, from and between mobile users. For example, Ambit's Support/Priority Messaging capability may be implemented in an application to request building access to provide another layer of security via the use of structured messages and communication with external systems with System Push. Another application is a security system that broadcasts a structured message to mobile users when an exception occurs (such as a forced entry to a building or a building's temperature threshold being exceeded) and allows users to quickly assess responses to provide real-world feedback to the situation.

The server 110 manages structured message 190 exchanges between a small number of organizational or system users 130 and a large number of mobile users 150 that have mobile devices 152 assigned to them, which have applications 154 either separate from or as part of the mobile device's 152 operating system. Several different types of structured messages 190 within the AIMS protocol define the behavior of the mobile devices 152 and the mobile applications 154 hereon. Structured messages 190 sent from organizational or system users 130 are delivered to individual mobile users 150 or pre-defined groups of mobile users 150. Structured messages 190 sent from the mobile users 150 are delivered to the organizational users 130.

The server 110 of the present invention is a messaging server that performs at least the following messaging functions: 1) pass all structured messages 190 addressed to mobile users 150 to the messaging service module 220 that distributes these messages 190 to the mobile users 150, and 2) pass all structured messages 190 addressed to system users 130 and archive these messages 190 if the organization's system client 120 is not available.

Other, specific server functions are integrated with mobile push messaging services 360, either provided as part of the Ambit service directly, or by third parties. In one embodiment of the present invention, such a mobile push messaging service 360 includes a BlackBerry push server. Integration with such a mobile push messaging service 360 allows the secure mobile data communications apparatus 100 to pass all system and exception messages from the messaging service module 220 to the system client 120, include a database that characterizes all mobile users 150 as well as all message types and group associations among mobile users 150, support web-attached system clients 120 for sending and receiving messages, support web-attached administrators to maintain and update the database, support pre-defined distribution lists of mobile users 150, and log all message activity including acknowledgements 390 and provide the log to system users 130 (upon request) for audit trail information.

The server 110 is designed to operate as a stand-alone server with web connections to the system users 130 and connections to push messaging services 360. With regard to the Blackberry push server, the server 110 is connected to the BlackBerry BES and BIS-B servers via the web, and minimizes the latency of all message passing activity, supports a SQL database and a Java run-time environment, supports multiple instances of a standard web server (such as Apache), and supports message server application programming interfaces. The server 110 supports intermediary push services such as the BlackBerry push service API, operates generally on the Linux operating system, and includes a server control system that coordinates the server activity and supports the various integration elements.

Generally, the server 110 according to the present invention operates autonomously on a continual basis, and provides for non-disruptive updating of the server control system and/or integration elements. The server 110 implements automatic restart and recovery, supports backup of the SQL database, logs and other important state information, and is capable of running in a virtualized server environment.

The design of the private mobile data communications apparatus 100 of the Ambit service enables message exchange, archiving and analytics services to be implemented as single or distributed multi server solutions. Depending on the implementation of the service, several classes of users may interact directly with the Ambit server 110, including service manager(s) and the system administrator(s). Components of the server 110 which provide analytics and serve a system client 120 can be implemented on separate and distinct machines.

Figure 4:
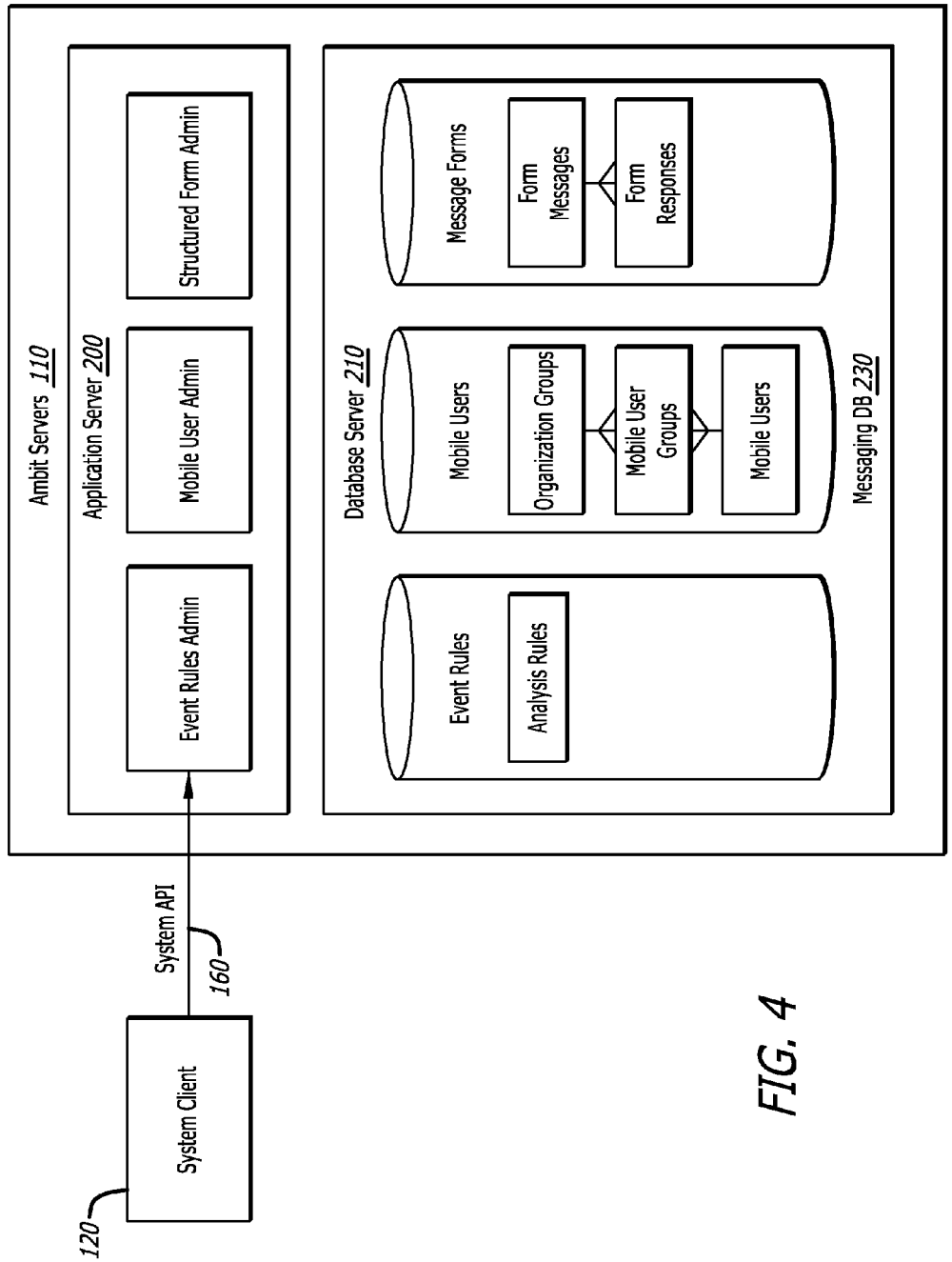
FIG. 4 is a block diagram of administrative actions within a private mobile data communications apparatus according to the present invention.

The system client 120 provides an organization 105 or system user 130 with the capability to administer and manage the Ambit service, to distribute structured messages 190 to all or selected parts of the organization, and to analyze the responses from the organization's mobile users 150. FIG. 4 is a block diagram depicting various administrative actions of the system client 120. An application server 240 includes thereon various modules, including an administration portal module 250 for managing one or more administration portals 260, which are used primarily to administer the Ambit service. The one or more administration portals 260 control a user administration interface 290 and a message administration interface 300. Another module is an event portal module 270 for managing one or more event portals 280, which manage critical message and response traffic via an analytics and reports module 310. The system client 120 includes significant analysis and event presentation capabilities in order to provide the organization with information in a format that is well structured for decision making and action.

In one embodiment of the present invention these portals are web portals 260 and 280 implemented in Java and the .net framework. Other frameworks are also contemplated, and therefore the present invention is not limited to any one framework for implementing a web-based portal.

The one or more administration portals 260 provide the system user 130 with the ability to add, delete and modify individual users and groups in the Ambit service. Administration portals 260 are also responsible for assigning rights and privileges for the service. Once the Ambit service is configured to meet the system user's 130 requirements, administration portal 260 duties are primarily adding or deleting individual users or changing user characteristics or permissions, as well as maintaining form messages (structured messages 190 that are available for re-use) and message policies (rules that determine how the message is delivered and displayed on the mobile device). For smaller organizations, the one or more administration portals 260 provide administrative functions as a service for the system user 130. The one or more administration portals 260 are designed for ease of use and utilize organizational defaults for many of the administrative characteristics of individual users or groups.

The one or more event portals 280 provide the system user 130 with operational interfaces for the secure mobile data communications apparatus 100. Event portals 280 are used for the day-to-day operation of the private mobile data communications apparatus 100. Organizations 105 use the one or more event portals 280 to originate messaging from either internal or external sources into the private mobile data communications apparatus 100 of the Ambit service, to receive alert messages from individuals using mobile applications 154, and to generate analysis reports from the server 110. The one or more event portals 280 function as stand-alone applications or are integrated with other systems, and are accessed through both mobile and non-mobile system client applications. Event portal 280 activities are shared among multiple users or co-located with the server 110 or the system user's 130 security or information technology systems.

The system client 120 includes a database server 320 that has multiple components, including a user administration database 330, a message administration database 340, and an event sync database 350. The user administration database 330 is a storage component for system user 130 and mobile user 150 information, and includes modules configured for managing system permissions and system user 130 and mobile user 150 profiles. The message administration database 340 is a storage component for message and response types, and the event sync database 350 is a storage component for data regarding structured messages 190 and how mobile users 150 respond. The server 110 communicates with both the application server 240 and with the database server 320 as a controller that allows the organization's users to work within the private mobile data communications apparatus 100 and the Ambit service via the administration and event portals 260 and 280, and that allows data flowing within the private mobile data communications apparatus 100 to be communicated, stored, manipulated, and transformed as needed by the organization 105.

Regardless of the configuration embodiment, the integration techniques and network components of the present invention are used to perform the key features of the present invention. FIG. 5a-5d are diagrams of different examples, or use cases, in which the private mobile data communications apparatus 100 facilitates structured messaging 190 between system users 130 and mobile users 150.

In one embodiment, the present invention enables an organizational system user 130 to send, monitor the success of, and confirm receipt of structured messages 190 to and from the one or more mobile users 150. Certain elements of the structured messages 190, such as the display and information elements, are structured to give preset choices for delivery and response. The messages 190 include identifiers that facilitate handling and processing which expedite analytics and organized presentation of aggregated messages 190. In addition to identification and classification information, the structured messages 190 may include a text payload that is limited only by the payload of the mobile devices 152 it is delivered to.

FIG. 1 describes the general connectivity for a use case of FIG. 5a-5d according to this embodiment of the present invention. Mobile push messaging services 360 are the vehicle for structured messaging 190 between the server 110 and the mobile users 150 via the mobile client 140, and the system event push service 180 communicates structured messaging 190 between the server 110 and the system client 120. One or more mobile applications 154 may be employed to allow mobile users 150 to interact with the system client 120. As noted elsewhere herein, a mobile application 154 may be a use-specific piece of software resident on a mobile device 152, or may be software resident on the mobile device 152 as part of the device's operating system. Regardless, the use cases in FIG. 5a-5d describe four different examples of types of structured messaging 190, with a wide range of real world applications for organizations 105.

Figure 5A:
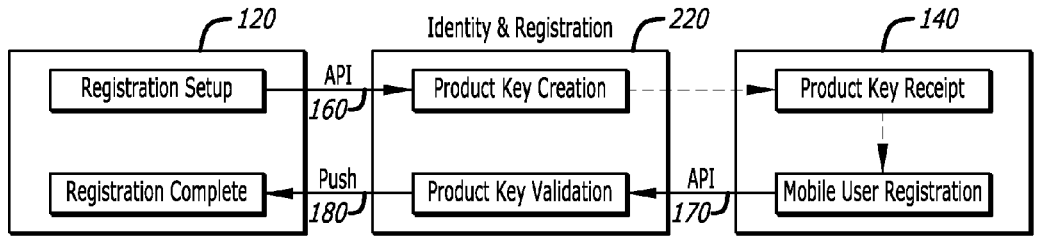
FIG. 5a is a block diagram of a use case example for structured messaging communication in a private mobile data communications apparatus according to a particular embodiment of the present invention.
Figure 5B:
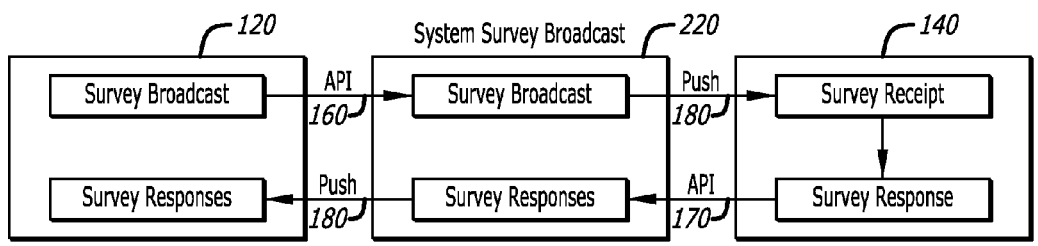
FIG. 5b is a block diagram of another use case example for structured messaging communication according to a particular embodiment of the present invention.
Figure 5C:
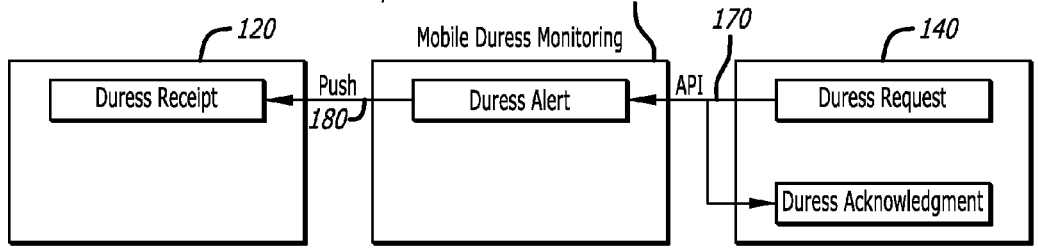
FIG. 5c is a block diagram of another use case example for structured messaging data communication according to a particular embodiment of the present invention.
Figure 5D:
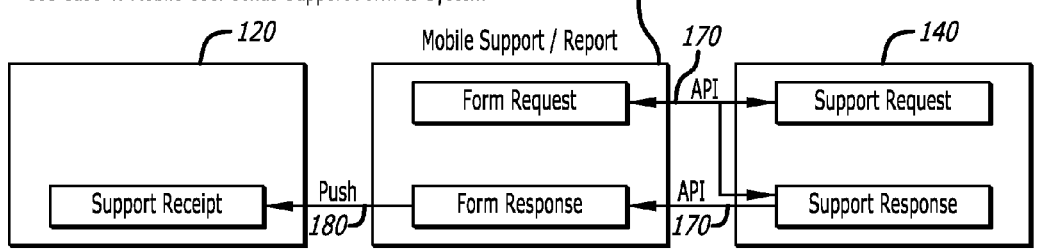
FIG. 5d is a block diagram of another use case example for structured messaging data communication according to a particular embodiment of the present invention.

Each of these applications utilizes the following core communication activities:
  i) identity and registration of mobile users initiated by either the system client 120 or the mobile user 150 (FIG. 5*a*),
  ii) status request messaging initiated through the system client 120 (FIG. 5*b*),
  iii) mobile user-initiated messaging initiated through mobile applications 154 or a mobile operating system (FIG. 5*c*), and
  iv) mobile user-initiated support request and reporting communicated through mobile applications 154 or a mobile operating system (FIG. 5*d*).

These communication activities all utilize structured messaging 190 between the organizational system user 130 and mobile users 150.

FIG. 5*a* demonstrates a registry and identity use case in which mobile users 150 interact with the system client 120 via the server 110 to register with the Ambit service. The messaging module 220 includes a product key module 410 that permits, via structured messaging 190 and AIMS messaging protocol discussed herein, mobile users 150 to validate a product key 420 to establish a unique identity and register with the Ambit service. The system client 120 begins a registration setup process that communicates with the messaging module 220 via the system API 160 to generate a new product key 420 for the mobile user 150. On the mobile client 140 side, the product key 420 is received, and the mobile user 150 registers with the Ambit service. Return data flow via the mobile API 170 validates the product key 420 at the messaging module 220, and via the system even push service 180, notification is sent to the system client 120 that registration of the mobile user 150 is complete. In one embodiment, mobile users 150 with new, or unrecognized, mobile devices 152 can request a product key 420 or otherwise begin the registration process with the Ambit service via the mobile operating system already resident on the mobile device 152.

FIG. 5*b* describes a use case where the system client 120 broadcasts a survey to one or more mobile users 150. Status request messaging in this embodiment is intended to solicit a response from the mobile user 150, and a receipt acknowledgement may be communicated to inform the system user 130 of receipt. In this embodiment a structured message 190 in the form of a response is communicated back to the system user 130. FIG. 5*c* describes a mobile duress monitoring use case where the mobile user 150 initiates contact, either via a specific application 154 on the mobile device 152 or by initiating contact using the device's operating system, and sends a duress request 380 via the mobile API 180, which is sent to the system client 120 and the system user 130 via the system even push service 180. The system user 130 in this embodiment then communicates an acknowledgement 390 back to the mobile user 150 or takes some action, or both. FIG. 5*d* shows a mobile support and reporting use case where the mobile user 150 initiates contact, either via a specific application 154 on the mobile device 152 or by initiating contact using the device's operating system, and sends a support request 370. The system user 130 in this embodiment then communicates an acknowledgement 390 in the form of a support response or takes some action, or both. The messaging module 220 manages structured messaging 190 in this use case by directing form support requests from the mobile user 150 and sent via the mobile API 170. Requests for support are communicated to the system 120 via structured messaging 190 in system event push service 180.

The present invention therefore enables an organizational system user 130 to distribute structured requests 190 and then assess the status of the distribution and the structured responses 190. Mobile users 150 may initiate a structured message 190 through the one or more Ambit mobile applications 154 or through the mobile device 152 operating system, and the message is pushed to the organizational system user 130. The structured message 190 has predetermined protocols for delivery based on the recipient and the message type. The structured message 190 may also include GPS location and other information. In the embodiment where GPS is activated, an Ambit native application may deliver location and updates until the mobile user 150 has ended that message session. Other information may be provided based on phone or device functions, including voice recording, audio, video, and photography. Purposes of structured messaging 190 within the secure mobile data communications apparatus 100 include duress notification, status updates, movement monitoring, and maintenance notification. Specific applications of the structured messaging aspect of the present invention include, but are not limited to, critical messaging alerts, emergency alerts, guard tours, mustering, training exercises, security alerts, geo-located information, and dissemination of video and photos to the organization 105.

In one embodiment, the present invention provides organizational information distribution, with the capability to distribute information through the system client 120 to individuals, a group, or groups of users with registered mobile applications 154. All mobile users 150 targeted for such information distribution receive immediate notification in one or more of the following ways: changes to icons, pop-up messages in the display of the mobile device 152, and sounds and vibrations all to indicate messages arrived and, or has not been read. These indicators that indicate the arrival of a message are made possible by the interaction registered mobile applications 154 and the mobile device 152 when the message arrives. Key features of organizational information distribution include the use of mobile TCP/IP data connectivity, mobile platform push technologies and applications that reside both at the organizational system user 130 and on the mobile device 152. These features enable information distribution to be communicated quickly via various levels of confirmation that the message was successfully sent, that the message arrived on the mobile user's 150 mobile device 152, and that the message was confirmed by the mobile user 150 through interaction with a mobile application 154.

In another embodiment the present invention provides a mobile user-initiated status service. Ambit provides mobile applications 154 to the mobile users 150 of organizations 105 from which those mobile users 150 are able to initiate and send messages to the organizational system user 130 that update their status. The service of this embodiment offers a high degree of utilization of the features, functions and capabilities of mobile devices 152 that enable mobile users 150 to communicate structured messages 190 to their organizations 105. The identity of the mobile user 150 is predetermined through registration, and the message initiated by the mobile user 150 has structured characteristics that enable the message to be routed to the appropriate system client 120.

Mobile user-initiated status enables the mobile user 150 to quickly send a message to the server 110 which in turn distributes to the designated system client 120 throughout the organization 105. Examples include panic button alerts or more complex aid requests with status and location information, similar to the existing OnStar™ service. Organizational responses to mobile user-initiated status messages are defined by policy and workflow of the organization 105 and are unique to the organization 105. For all mobile user-initiated status messages, responses from the server 110 confirm receipt of the message by the server 110 and, when available, confirmation of receipt from the system client 120.

The present invention also provides organizations 105 with message capabilities that enable the organizational system user 130 to initiate a status request that delivers a structured message 190 in the form of a pop-up message on the mobile device 152 of a mobile user 150. With these services, described as organization-initiated status requests, the organization 105 originates a structured message 190 containing a structured response for delivery to specified registered mobile applications 154. The structured messages 190 are generally simple, intuitive and provide for easy response, but allow for the mobile user 150 to provide additional information.

Following delivery of an organization-initiated status request, organizations 105 immediately receive from the server 110 the status of each of the structured messages 190 sent to the mobile applications 154. The message status includes automated acknowledgment of successful delivery through networks and to the mobile application 154, as well as when the message is interacted with by the mobile user 150. The acknowledgement also includes opted-in or available auxiliary information, such as GPS location of the mobile user 150, when available.

In another embodiment, organization-initiated status requests are structured to allow the organization 105 to canvass or poll mobile user 150 group(s) for a variety of uses. A primary function of the organization-initiated status request is to obtain time critical feedback from the mobile user 150 that is required for decision making. Another function of organization-initiated status requests is to rapidly establish the status of the community of mobile users 150 so that the organizational system user 130 can plan effectively in the case of events that challenge the availability of the individuals in the organization 105. Responses can be analyzed or synthesized and the responses can be presented in a summarized form so that the originator of the message can make a quick but informed decision.

The system event push service 180 is a system interface that sends detailed information as events occur, by triggering actions configured within the server 110 that integrate and communicate data. Actions include, but are not limited to, calling a web service hosted by a third party, calling an external application programming interface, sending an email, pushing a message, or populating a database table. The system event push service 180 allows organizations 105 to receive event data as the event occurs and then store and process it without any further dependency on the secure mobile data communications apparatus 100 for that event data. Actions are triggered by the initiation of events, and event data flows through the private mobile data communications apparatus 100 to and from system clients 120 and mobile clients 140, and to and from external systems 400, regardless of whether initiated on the system client 120 side or the mobile client 140 side.

Events can be initiated by the system client 120 and by the mobile client 140. The system event push service 180 allows the secure mobile data communications apparatus 100 to relay these events in several different ways and to different types of external systems 400, as noted above. Examples of a system client-initiated event include a survey broadcast to mobile users 150. Examples of a mobile client-initiated event include registration with the secure mobile data communications apparatus 100, an indication of duress, a support request, or a response to a survey.

The present invention integrates with external systems 400 by communicating information via the event relay module in many different ways. Expanding on the above examples, the present invention can generate a custom email that is sent to any email address to be processed by an external system 400. The private mobile data communications apparatus 100 of the Ambit service can also be configured to call any application programming interface over HTTP (via a web service call or socket interface), such as where a mobile user 150 presses a help button and triggers an action in an external security system to alert other personnel who are using that external system 400. This is referred to in the diagrams as a "System Push". The private mobile data communications apparatus 100 of the Ambit service can further be configured to insert records into an external database, such as where a mobile user 150 presses a support button and triggers an action to insert a support request into a queue in a database of an external system 400.

Yet another example includes sending a structured message 190 via a mobile push messaging service 360. In this case, the event relay module 180 triggers an action that is handled within the private mobile data communications apparatus 100 itself. For example, a mobile user 150 presses a "Monitor Me" button and this triggers an action to push a warning message to other mobile users 150 within the same organizational network.

The first application programming interface 160 and the second application programming interface 170 are system interfaces that determine how event data is communicated through the private mobile data communications apparatus 100 of the Ambit service. These two application programming interfaces 160 and 170, otherwise known as APIs, are a system API (the first application programming interface 160) and a mobile API (the second application programming interface 170.) The mobile API 170 is a communications layer that is standard across all mobile clients 140 and mobile users 150, and the system API 160 is communications layer that is standard across all organizational system clients 120 and system users 130. The system API 160 and the mobile API 170 are designed to operate across all system environments and mobile device platforms, without any dependency on specific tools or libraries.

The system and mobile APIs 160 and 170 are formatted as REST-based web services with all data being sent as parameters in a query string via GET or parameters within a POST. Note that all calls are made to the same API function name "Execute", and that it is the parameters that determine which method is to be called. This further simplifies client integration because the main part of the API call is essentially the same. This format is employed across both system APIs 160 and mobile APIs 170. All API responses are in XML format (or JSON, CSV, etc.). Standard fields are returned with every call, in addition to information specific to the API call.

System APIs 160 are used by system administrators and operations staff to manage an organization's use of the secure mobile data communications apparatus 100 and the Ambit service generally and to communicate by sending structured messages 190 to the mobile users 150. One example of a system API is a Send-Message-To-Mobile-Phones API, used whenever the organizational system user 130 wants to communicate with individual or groups of mobile users 150. All structured messages 190 are delivered and displayed in structured formats that require the mobile user 150 to send a structured response. Structured messaging 190 allows for straightforward response aggregation and statistical analysis. Example uses include broadcasting a message to mobile users 150, polling mobile users 150, and sending a survey to mobile users 150.

A system API 160 of this type may have, as input data, information that determines time and date, credentials to use the API, message title, a list and count of recipient mobile devices, a format of a structured message, message text, a type response to be displayed on a mobile device 152, a list and count of mobile user responses, a flag to determine if additional responses are permitted, a flag to request a GPS location, and a software release version number. Several different types of output data may also be generated by this system API 160. A system API 160 of this type may have output data that includes a structured message broadcast identifier, an event identifier, the time and date that the secure mobile data communications apparatus 100 both received the request and completed the request, a code indicating success or failure, an identifier for a return message, a description of a result, a message to be displayed on a system level, and the organization 105 that the mobile user 150 belongs to. This input and output data may therefore also include one or more of the system identifiers that identify and track certain events and physical devices.

Input and output data may vary depending on the type of API and the intended communication. In another example of a system API 160, a Get-GPS-From-MobileDevice API is used whenever the secure mobile data communications apparatus 100 of the Ambit service wants to obtain the geo coordinates from one or more of the mobile devices 152. Input data for an API of this type, in addition to the data fields, described above, may include a GPS request option field that determines whether the user will be notified regarding the request for GPS information and whether they will be prompted to confirm the GPS request.

Mobile APIs 170 are APIs that are called by the mobile applications 154 and are used consistently across all mobile platforms. One type of mobile API 170 is a Register-Mobile-With-Ambit-System API, used to register the mobile application 154 on the mobile device 152. When called, this API results in the generation of a MobileDevice GUID by the server 110 and returned in the response. The GUID is also stored on the mobile device 152 and used for all future API calls. Any re-registration attempts of by the same mobile device 152 should send the MobileDevice GUID previously stored. This type of API 170 is a also security feature of the present invention, as the Ambit service will reissue a registration key if the MobileDevice GUID is returned upon re-registration, because it will be unable to determine if the registration key is being shared.

Input data for this type of API 170 may include the date and time and indicated by the mobile device 152, the GUID identifier generated by the mobile device 152 for each and every response or mobile device-initiated message, an alternative mobile device identifier and code, a phone number for the mobile device 152 if it includes phone capability, a codes indicating the device platform, product, operating system version, and mobile data and/or telephony carrier, and a product registration key. Output data from such an API 170 may include web service log identifiers, start and end time and date, success and return codes and descriptions, a mobile send identifier, the mobile device GUID mentioned above, an organization identifier, and display types, messages, and number of seconds the display should be shown.

Other mobile APIs 170 include, but are not limited to, a Update-Push-Status-For-Message-Recipient API, to be called any time the status changes for a broadcasted message, for example whenever the push status is updated, to acknowledge mobile receipt of a system message. Another mobile API 170 is a Send-Mobile-Response-To-System-Message API, which is a function to send data from a mobile device 152 by a mobile user 150 to the server 110 in response to a system message broadcast. Yet another mobile API 170 is a Send-Mobile-Incident-Message API, initiated by and sent from a mobile application 154 by a mobile user 150 for any duress-related message. Still another mobile API 170 is a Send-Mobile-Support-Message-Request API initiated by and sent from the mobile user 150 to request support. Note that this API 170 results in the request of a structured form which is to be displayed within the mobile application 154, the content of which may vary as determined by the Ambit message server 110 based on the context of the user or situation. In this mobile API 170, the mobile application receives the standard confirmation XML plus the information necessary to generate a popup form, just as if it had received it from a regular push message.

The system APIs 160 and mobile APIs 170 work together to provide end-to-end integration for typical organizational uses, and the following examples demonstrate steps in the process of such system API 160 and mobile API 170 integration. In the embodiment of the present invention where registration of a mobile device 152 is sought, for example, the Register-Mobile-With-Ambit-System mobile API 170 is called by a mobile device 152 via a mobile application 154 or device operating system based on a mobile user-initiated or mobile device-initiated action. The API call is made via a web service. The system client 120 acknowledges registration by calling a Mobile-Push-Wrapper API, which begins on the mobile client-side 140 by pushing a message via a platform mobile push messaging service 360. A log message and log registration are communicated to a push messaging database, and a send registration status message is sent to the mobile client 140. The mobile device 152 is then registered via the push service, and on the system client 120 side, the mobile device 152 is added to the server database 230. The mobile client 140 displays a registration notification on the mobile device 152 of success or failure.

Figure 6:
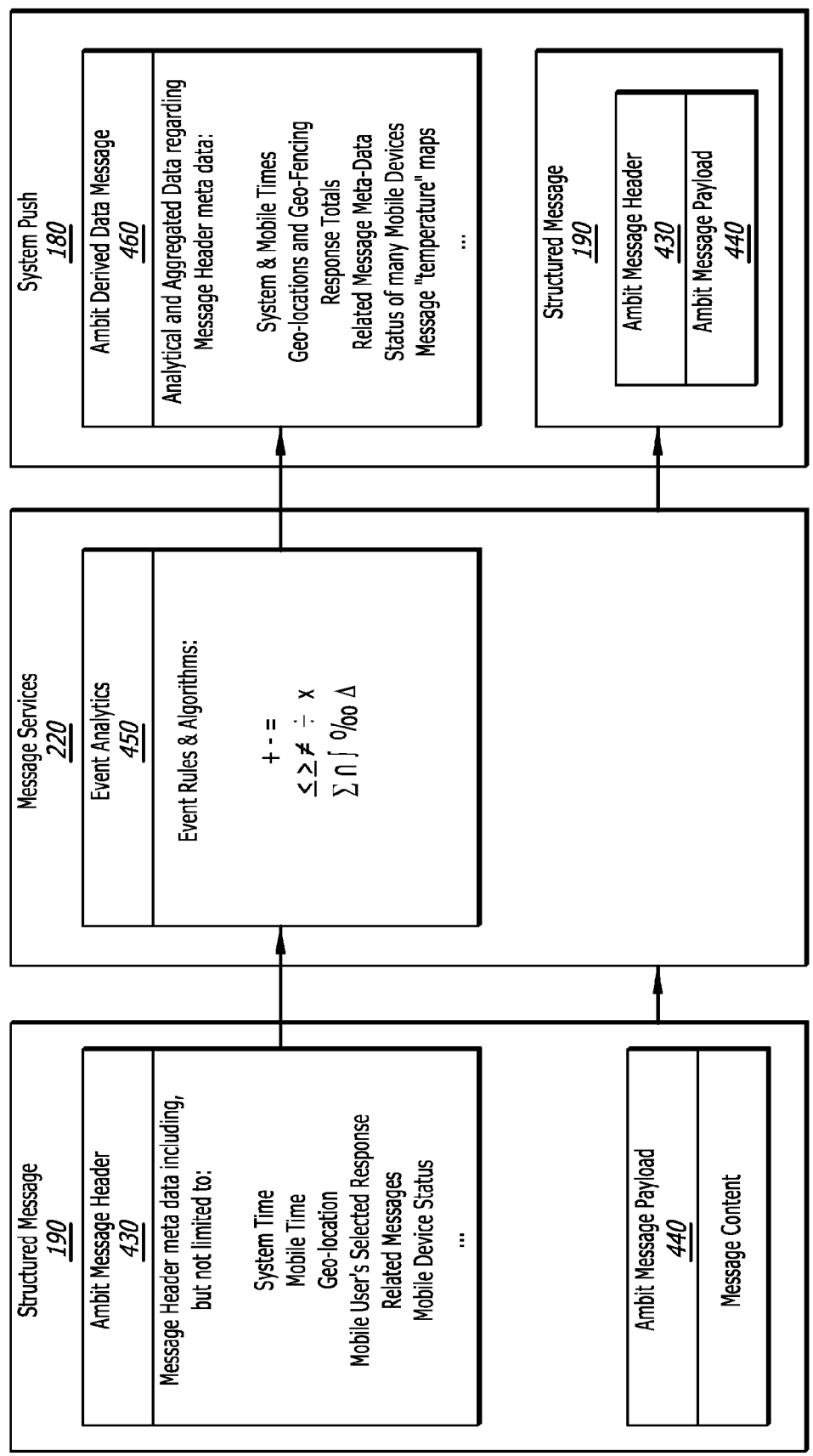
FIG. 6 is a block diagram of system components of message structure and event analytics associated with structured messaging in a private mobile data communications apparatus according to the present invention.

FIG. 6 is a block diagram of system components of messaging structuring according to the AIMS protocol and event analytics associated with structured messaging 190 in the private mobile data communications apparatus 100. A structured message 190 according to the present invention is a set of database objects that includes a message header 430 having information identifying certain characteristics of the message 190. Examples of this information, which may or may not be in the form of metadata, may include system time, mobile time, location coordinates, a mobile user's selected response, related messages, and a mobile device status. A structured message also includes a message payload 440 that includes the structured message 190 content.

FIG. 6 demonstrates that present invention also includes an event analytics module 460 that applies rules and algorithms to process structured messaging 190. Event analytics performed by the event analytics module 460 within structured messaging 190 are controlled by the system event push service 180 which instructs what the Ambit service will do with structured messaging 190 and consequently how to interpret message header 430 information and message payload 440 information. The Ambit service may derive certain data interpreted from a structured message 190 and construct a new derived data message 450 for use by the system client 120, system user 130, or the server 110. As noted above, the system even push service 180 is also responsible for managing communication of the structured messaging 190 within the Ambit service.

In another embodiment of the present invention where system messaging in the form of a survey broadcast is the form of system communication, the system API 160 and mobile API 170 integration begins on the system client 120 side with a message selection by a system user 130 via the system client 120. The system client 120 adds the message to the server's 110 managed database 320 and initiates a message push with a list of all subscriber recipients with a Mobile-Push-Wrapper API call. On the mobile client 140 side, this API 170 then pushes messages to each subscriber via the mobile push messaging service 360, and the message is displayed on the mobile device 152 to the mobile user 150. Since a survey response is requested, the response sent back to the mobile client 140 initiates two mobile APIs 170, one for acknowledgment of the mobile receipt of the system message, and another to send the mobile response to the system message. Each of these mobile API calls via the Ambit web service update the server's 110 managed database 230, with information about the mobile receipt and user response, respectively.

In still another embodiment of the present invention where mobile messaging in the form of a requesting support and indicating duress is the form of system communication, the system API 160 and mobile API 170 integration begins on the mobile client 140 side with a mobile device-initiated or mobile user-initiated message. The mobile client 140 initiates a mobile API 170 to send the mobile message, and the private mobile data communications apparatus 100 adds the message to the managed database 230 of the server 110 and acknowledges receipt. It then initiates a system API 160 to push a message to the subscriber, logs the push, and acknowledges the mobile user 150 via mobile push messaging services 360 and the mobile client 140, which displays the acknowledge for the mobile user 150 on the mobile device 152.

In one embodiment of the present invention, the private mobile data communications apparatus 100 of the Ambit service identifies and tracks certain events and physical devices by assigning one or more unique identifiers. Identifiers are values assigned in several different fields for the purpose of identifying and tracking, and may be assigned so as to guarantee uniqueness across all systems and customers by having a generic format.

One such identifier is a mobile identifier. All mobile devices 152 must register with a unique value, and the mobile identifier may be a randomly generated guaranteed unique identifier, or GUID, which allows the format to be generic across all brands and types of mobile devices 152. Another identifier is an event identifier, which is a GUID generated by the either the system client 120 or by the mobile client 140 via an API and used to group multiple structured messages 190 and responses for any given subscriber under a single "event". The present invention contemplates that an event identifier be sent back and forth between the mobile client 140 and system client 120 for all communication relating to a specific event. If multiple structured messages 190 are exchanged between the system client 120 and mobile client 140 for a given event, then this identifier remains the same throughout this exchange. For example, if a mobile application 154 sends a duress signal followed by a series of coordinates, then each of these messages will share the same event identifier that was generated at the start of the duress session. Once the duress session has ended the corresponding event identifier will not be used again. Any new duress session will have a new unique event identifier.

A mobile send identifier is another unique identifier generated by the system client 120 or mobile client 140 via an API and therefore may also a guaranteed unique identifier. If there are multiple structured messages 190 being sent for the same event, then each structured message 190 must have a different send identifier. The mobile application 154 returns this identifier in any responses so that the private mobile data communications apparatus 100 of the Ambit service can associate these with the original message, as well as any communication back to the system client 120 via its system API 160 calls. If the send identifier is a guaranteed unique identifier, the value is agnostic to the push server technology (which may have its own push identifier that can also be included when sending the message to the mobile device itself). For example, if a mobile application 154 sends a duress signal followed by a series of coordinates, then each of these messages will have a new send identifier, but still share the same event identifier that was generated at the start of the duress session.

Another unique identifier, the organization identifier, assigns a value to the organization 105 itself and therefore identifies the highest level aspect of system usage. Note that one organization 105 may have its own private mobile data communications apparatus 100, or it may co-reside on one private mobile data communications apparatus 100 with other organizations 105. Therefore all other identifiers in the system ultimately relate back to one organization identifier, and consequently to only one organization 105 either directly or indirectly.

It is to be understood that many other identifiers are contemplated within the private mobile data communications apparatus 100 of the Ambit service, as described herein. For example, application programming interface calls may require, as input or output data, specific identifiers. Examples include a push identifier generated by a push server to identify a particular mobile device 152 that is receiving a structured message 190 push, to provide the Ambit service with a way to tie back to the data on the push server for debugging, an audit trail, etc. Other identifiers contemplated a structured message broadcast identifier representing one broadcast of a specific message to multiple mobile users 150, and a structured message recipient identifier generated for each mobile user 150 that is a recipient of a particular message. Still others include a web service log identifier for each and every web service call made that is used for an audit trail of events, and a web service log identifier that is a GUID for each and every web service call made, and tied to log file messages on the server 110.

The private mobile data communications apparatus 100 of the present invention contemplates that one or more mobile applications 154 provide an organization's mobile users 150 with access to the Ambit service. The server 110 interacts with these mobile applications 154 to several core communication activities, including but not limited to information distribution initiated through the system client 120, mobile user-initiated messaging initiated through mobile applications 154, and status request messaging initiated through the system client 120. These core communication activities provide a rich set of communication solutions for organizations 105, and provide a basis for the private mobile data communications apparatus 100 of the Ambit service to access and use many current features of mobile devices 152 and also connect to available features and applications of those mobile devices 152.

Mobile applications 154 are designed to work on a wide range of mobile device 152 platforms, and therefore the present invention is to be implemented regardless of the handset manufacturer, network provider, data carrier, or mobile operating system. These mobile applications 154 are designed so that they can easily be implemented with logos, color schemes and skins appropriate for organizations 105.

The core communication activities described above are provided with best practices in mobile security and are encrypted to ensure privacy and integrity of the service. Since the packet communication required is small in size for most communications, the private mobile data communications apparatus 100 provides lightweight encryption techniques as an appropriate level of protection in most cases—the objective is to provide the greatest degree of resiliency in stressed communications environments. Nevertheless, the present invention is designed to implement many other types of encryption, and the invention is not limited by any particular technique.

The server 110 identifies the instances of the registered mobile applications 154 using several methods. Typically identity can be accomplished at the IMEI (International Mobile Equipment Identifier) level for the greatest flexibility, but alternative approaches are also contemplated. This also permits individual users to participate in multiple instantiations without conflict or interference. In the case of an individual participating in multiple instantiations, a separate mobile application 154 for each instance may be provided.

The mobile applications 154 component of the private mobile data communications apparatus 100 is dynamic and functional across all mobile device 152 platforms that are in wide use within organizations 105. This includes, but not limited to, the BlackberryOS, iPhoneOS, Android, Symbian and Windows Mobile 7 operating systems. The mobile applications 154 contemplated within the present invention take advantage of the features and information available on mobile devices 152 as well as the push technologies available for messaging on the many mobile device 152 platforms.

The present invention is designed to access other applications and features of mobile devices 152 such as video, sounds, camera, recording and other third party applications available to provide information over the private mobile data communications apparatus 100. While in most cases, the present invention maintains low-bandwidth and small message size character of the communications between the mobile applications 154 and the server 110, the use of imagery, sounds, recording and other applications and features are available. Regardless, it is within the scope of the secure mobile data communications apparatus 100 to utilize other features and applications, and to that end, the present invention uses compression techniques or other known methods of transmitting large files.

The private mobile data communications apparatus 100 of the Ambit service, as described above, is in one embodiment implemented in a network configuration that connects a system client 120 with mobile users 150 via the server 110. Depending on the needs of the customer, each of the various components may be split across multiple servers for distributed processing to ensure a high-availability, high-performance system—as well as consolidated onto fewer servers for smaller business with more modest requirements. It is therefore to be understood that the present invention is not limited to any one type of network configuration. The present invention may also be implemented as partially or entirely cloud-based, so that no hardware components need be resident in any system-side or central location.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A private mobile data communications apparatus comprising:
    a system client configured to manage interaction with a system user and including at least one system client database and a system client user interface controlled by an application server;
    a mobile client configured to manage interaction with a mobile user having one or more mobile devices assigned to the mobile user, the interaction with a mobile user and the interaction with a system user each including bi-directional structured messaging communications that are independently initiated by both the mobile user and the system user;
    a secure messaging server configured to manage interaction between the system client and the mobile client and with one or more external systems providing supportive services to either of the system client or the mobile client, the secure messaging server including an application server component and a database server component each performing messaging functions in the interaction between the system client and the mobile client and with one or more external system;
    a messaging protocol executed by a system event push service module and a mobile push messaging service module, and configured to initiate events from the secure messaging server and manage communication of event data between the secure messaging server and the system client, the mobile client, and the one or more external systems, the event data including information determined from initiated events among the messaging functions that is distributed to and collected from any combination of the system client, the mobile client, and the one or more external systems, the messaging functions including executing instructions to send structured messaging communications that include structured messages from the system client initiated by the system user and receiving structured responses from the mobile client sent by the mobile user related to one or more initiated events, and to send structured messaging communications that include structured messages from the mobile client initiated by the mobile user and receiving structured responses from the system client sent by the system user related to the one or more initiated events, each structured message and each structured response in the structured messaging communications enabling message archiving, message aggregation, and system traffic analytics to support responsive decision-making, and comprising a message header having information identifying certain characteristics of a message, a message payload that includes content, and predetermined protocols for delivery based on a recipient and a message type, each structured message delivered and displayed in a structured format prompting a structured response;
    a first application programming interface module configured to respond to calls initiated for exchange of the event data between the secure messaging server and the system client to enable communication with the mobile user; and
    a second application programming interface module configured to respond to calls initiated for exchange of the event data between the secure messaging server and the mobile client to enable communication with the system user that are initiated by the mobile user.

2. The apparatus of claim 1, wherein first application programming interface module manages push messaging that communicates the structured messages and the structured responses to and from the mobile user.

3. The apparatus of claim 2, wherein the information determined from initiated events among the messaging functions includes information contained at known locations in messages.

4. The apparatus of claim 3, wherein the information contained at known locations in messages includes at least mobile unit identifiers, times, message identifiers, message types, and geo-location information.

5. The apparatus of claim 1, wherein the initiated events include mobile registration, mobile duress, mobile support, and system survey responses.

6. The apparatus of claim 1, further comprising at least one identifier assignment module configured to issue one or more identifiers to an initiated event and one or more identifiers to a physical device.

7. The apparatus of claim 6, wherein each of the system client and the mobile client includes an identifier assignment module for assigning unique identifiers.

8. The apparatus of claim 7, wherein the second application programming interface module initiates the identifier assignment module to register at least one of a mobile application or a mobile device and generates a mobile unit identifier.

9. The apparatus of claim 1, wherein the at least one external system is a third party application programming interface call.

10. The apparatus of claim 1, wherein the a messaging protocol executed by a system event push service module and a mobile push messaging service module is configured to initiate events from the secure messaging server and manage communication of event data between the secure messaging server and the system client, the mobile client, and the one or more external systems on a mobile data network.

11. The apparatus of claim 1, wherein the a messaging protocol executed by a system event push service module and a mobile push messaging service module is configured to initiate events from the secure messaging server and manage communication of the event data between the secure messaging server and the system client, the mobile client, and the one or more external systems via a representational state transfer protocol.

12. The apparatus of claim 1, wherein the a messaging protocol executed by a system event push service module and a mobile push messaging service module is configured to initiate events from the secure messaging server and manage communication of the event data between the secure messaging server and the system client, the mobile client, and the one or more external systems over a hypertext transfer protocol.

13. The apparatus of claim 1, wherein the system client user interface includes a user administration interface and a message administration interface both managed by an administration portal through which the system client manages system users and messaging functions involving communication with mobile users, and an event portal through which the system client interacts to perform analytics and reporting on the event data, the administration portal and the event portal resident on the system client.

14. The apparatus of claim 1, wherein the system client database includes a plurality of database modules, the plurality of database modules including a user administration database storing data regarding system permissions and system users, a message administration database storing message types and response types, and an event sync database storing pushed structured messages and structured responses.

15. A method of managing private communications with one or more mobile users within an organization comprising:
connecting an organizational system user with one or more mobile users in the organization via a secure messaging server configured to manage a system client for communicating with the organizational system user and a mobile client for communicating with the one or more mobile users;
creating a structured request for information communicative of an event in response to an event initiation call from the secure messaging server via a messaging protocol executed by a system event push service module and a mobile push messaging service module, the messaging protocol comprising bi-directional structured messaging communications that are independently initiated by both the mobile user and the system user; and
pushing the structured request from a system client to the one or more mobile users, and a structured response having information responsive to the structured request to the secure messaging server where the structured request is initiated by the organizational system user, and pushing the structured request from the mobile client to the organizational system user, and a structured response having information responsive to the structured request to the secure messaging server where the structured request is initiated by the one or more mobile users, the structured request and the structured response allowing the organizational system user to interpret and execute a course of action related to the event initiation call,
each structured request and each structured response enabling message archiving, message aggregation, and system traffic analytics to support responsive decision-making, and comprising a message header having information identifying certain characteristics of a message, a message payload that includes content, and predetermined protocols for delivery based on a recipient and a message type, each structured request delivered and displayed in a structured format prompting each structured response.

16. The method of claim 15, wherein the structured request for information communicative of an event and the structured response having information responsive to the event are messages that include messaging information contained at known locations in the messages.

17. The method of claim 16, wherein the messaging information includes at least mobile unit identifiers, times, message identifier, message types, and geo-location information.

18. The method of claim 16, wherein the pushing the structured request from a system client to the one or more mobile users is managed by the system event push service module and performed by a first application interface module configured for communicating messages to the one or mobile users and receiving the structured response.

19. The method of claim 16, wherein the pushing the structured response having information responsive to the structured request to the secure messaging server is managed by the mobile push messaging service module and performed by a second application interface module configured for communicating messages from the one or more mobile users including the structured response.

20. The method of claim 15, further comprising assigning one or more unique identifiers to the event and one or more identifiers to a device, the assigning one or more unique identifiers performed by an identifier assignment module initiated by creating the structured request for information communicative of an event.

21. The method of claim 15, wherein the creating a structured request for information communicative of an event in response to an event initiation call from the secure messaging server to the one or more mobile users includes initiating communication with one or more external systems.

22. The method of claim 15, wherein the creating a structured request for information communicative of an event in response to an event initiation call and the pushing the structured request from a system client to the one or more mobile users, and a structured response having information responsive to the structured request to the secure messaging server include communicating information over a mobile data network.

23. The method of claim 15, wherein the creating a structured request for information communicative of an event in response to an event initiation call and the pushing the structured request from a system client to the one or more mobile users, and a structured response having information responsive to the structured request to the secure messaging server include communicating information via a representational state transfer protocol.

24. The method of claim 15, wherein the creating a structured request for information communicative of an event in response to an event initiation call and the pushing the structured request from a system client to the one or more mobile users, and a structured response having information responsive to the structured request to the secure messaging server include communicating information over a hypertext transfer protocol.

* * * * *